`US011723469B2`

United States Patent
Fowler et al.

(10) Patent No.: US 11,723,469 B2
(45) Date of Patent: Aug. 15, 2023

(54) ERGONOMIC METHOD FOR WORKING IN CONFINED WORK SPACES

(71) Applicant: Government of the United States, as represented by the Secretary of the Air Force, Wright-Patterson AFB, OH (US)

(72) Inventors: Eric Fowler, Warner Robins, GA (US); Michael Hayes, Warner Robins, GA (US); Kevin Eversley, Macon, GA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/550,362

(22) Filed: Dec. 14, 2021

(65) Prior Publication Data

US 2023/0180935 A1 Jun. 15, 2023

(51) Int. Cl.
*A47C 5/12* (2006.01)
*A47C 3/16* (2006.01)
*A47C 9/00* (2006.01)
*A47C 15/00* (2006.01)

(52) U.S. Cl.
CPC ............... *A47C 5/125* (2013.01); *A47C 3/16* (2013.01); *A47C 9/00* (2013.01); *A47C 15/004* (2013.01)

(58) Field of Classification Search
CPC ...... A63B 5/16; A63B 2225/093; B25H 5/00; B25H 3/02; B25H 1/16; A47C 5/125
See application file for complete search history.

(56) References Cited

U.S. PATENT DOCUMENTS

| 8,991,554 B2* | 3/2015 | Podzimek | B25H 5/00 |
| | | | 182/132 |
| 11,026,513 B2 | 7/2021 | Bates | |
| 11,421,477 B2* | 8/2022 | Simula | E06C 1/393 |
| 11,465,273 B2* | 10/2022 | Blaine | A47C 9/027 |

(Continued)

OTHER PUBLICATIONS amazon.com, Pain Free-Posture Large Foam Block (Large)-Box-Ottoman-New Harder, Solid & Stronger Density-Water Resistant Cover-Practical Handle & Removable Zipper Cover—Reduce Lower Back, Hip, Knee, Ankle Pain, Health & Personal Care, published on the internet at www.amazon.com/PAIN-FREE-AT-SEA-Posture/dp/B074DFTL2J, advertisement states that the product was first available Jul. 24, 2017.

(Continued)

*Primary Examiner* — Sarah B McPartlin
(74) *Attorney, Agent, or Firm* — AFMCLO/JAZ; Jeffrey V. Bamber

(57) ABSTRACT

An ergonomic method for working in confined work spaces is disclosed. The method, in some cases, includes the steps of: a) providing a support structure that is generally in the configuration of a rectangular prism having six faces, a length, width, and a height in which the length, width, and height differ from one another so that the structure provides three different height positions when the support structure is placed on the floor of the workspace; b) placing the support structure with one of its faces in contact with a contoured floor surface in a confined work space; and c) sitting or standing on the support structure.

12 Claims, 7 Drawing Sheets

(56) References Cited

U.S. PATENT DOCUMENTS

| | | | |
|---|---|---|---|
| 2007/0262622 A1* | 11/2007 | Tally | B25H 5/00 |
| | | | 297/183.3 |
| 2008/0164745 A1 | 7/2008 | Nichols | |
| 2009/0301913 A1* | 12/2009 | Scaletta | B25H 3/02 |
| | | | 220/630 |
| 2015/0231436 A1* | 8/2015 | Januszek | A63B 21/00047 |
| | | | 482/142 |
| 2020/0203152 A1* | 6/2020 | Park | H01L 21/67034 |
| 2021/0052936 A1* | 2/2021 | Park | A63B 21/0085 |

OTHER PUBLICATIONS

Del Turco, Lauren, The 9 Best Yoga Blocks of 2020 for Home or Studio Practice, Womenshealthmag.com, published on the internet at www.womensheatlhmag.com/fitness/g34687215/best-yoga-blocks/ on Dec. 3, 2020.

* cited by examiner

ERGONOMIC METHOD FOR WORKING IN CONFINED WORK SPACES

RIGHTS OF THE GOVERNMENT

The invention described herein may be manufactured and used by or for the Government of the United States for all governmental purposes without the payment of any royalty.

FIELD OF THE INVENTION

The present invention relates generally to ergonomic work methods and, more particularly, to support structures and ergonomic methods for working in confined work spaces.

BACKGROUND OF THE INVENTION

Workers in various industries, such as the aerospace industry, will at times, have to perform tasks in confined spaces. For example, workers will have to enter aircraft fuel tanks and perform maintenance or repairs inside the fuel tanks. Typically, aircraft fuel tanks will have a small opening for a worker to access the interior of the fuel tank. Entering and exiting through the opening is often difficult. In addition, the interior surface of the fuel tank on which the worker sits, stands, or kneels to perform their tasks is often not flat, and may have sharp edges, protrusions, or the like.

Previously, workers performing such tasks might use a 5-gallon plastic bucket that could be manipulated into the entry opening, which could be inverted and be strong enough to sit on once inside the tank. However, it has been found that using a plastic bucket as a seat could damage the aircraft and lacked the proper safety and ergonomic support. In addition, workers performing such tasks using a plastic bucket as a seat are subjected to unnecessary contact stress to their knees, squatting, bending and overextension of their arms to reach areas of work while in static, awkward positions.

A need exists for improved support structures and methods for enabling workers to ergonomically perform tasks in confined spaces.

SUMMARY OF THE INVENTION

The present invention relates generally to ergonomic work methods and, more particularly, to support structures and ergonomic methods for working in confined work spaces.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, the method comprising the steps of:

a) providing a support structure that is generally in the configuration of a rectangular prism having six faces, a length, width, and a height, wherein the length, width, and height differ from one another so that the support structure provides three different height positions when the support structure is placed on the floor of a workspace;

b) placing the support structure with one of its faces in contact with a contoured floor surface in a confined work space, wherein the support structure has a top surface that faces upward when the support structure is placed on a surface and a bottom surface that is placed upon the floor of the work space so that the top surface of the support structure is spaced a first distance from the floor of the work space; and c) sitting or standing on the support structure.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to ergonomic work methods and, more particularly, to support structures and ergonomic methods for working in confined work spaces.

Figure 1:
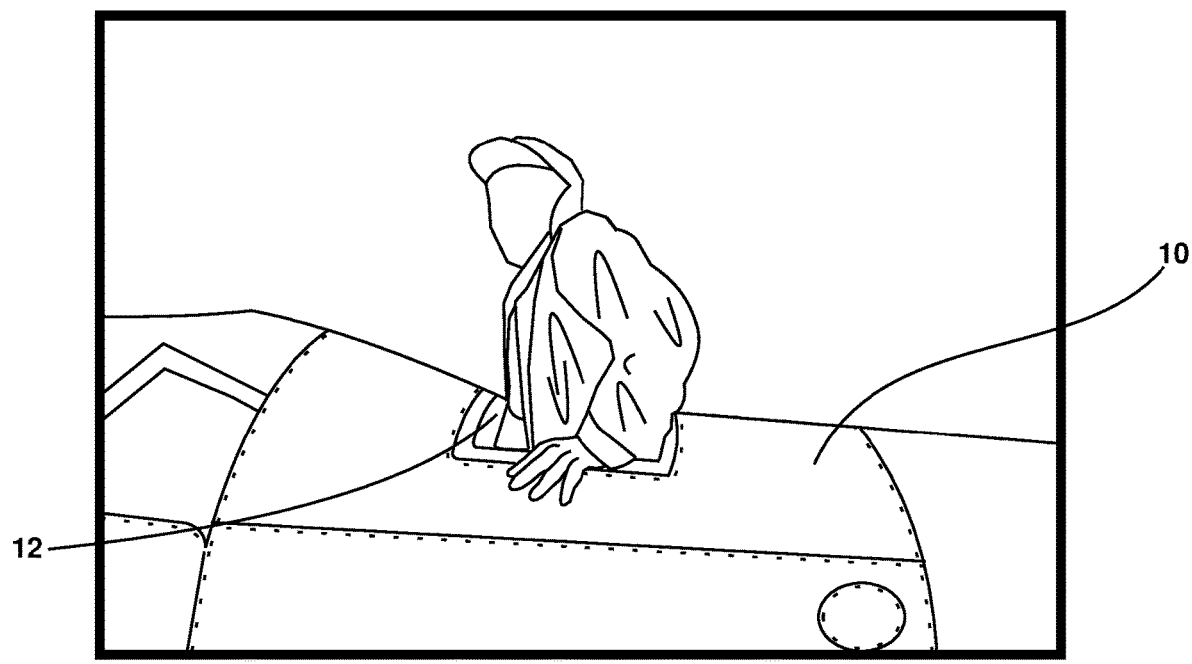
FIG. 1 is a perspective view of a man lowering himself into an aircraft fuel tank.
Figure 2:
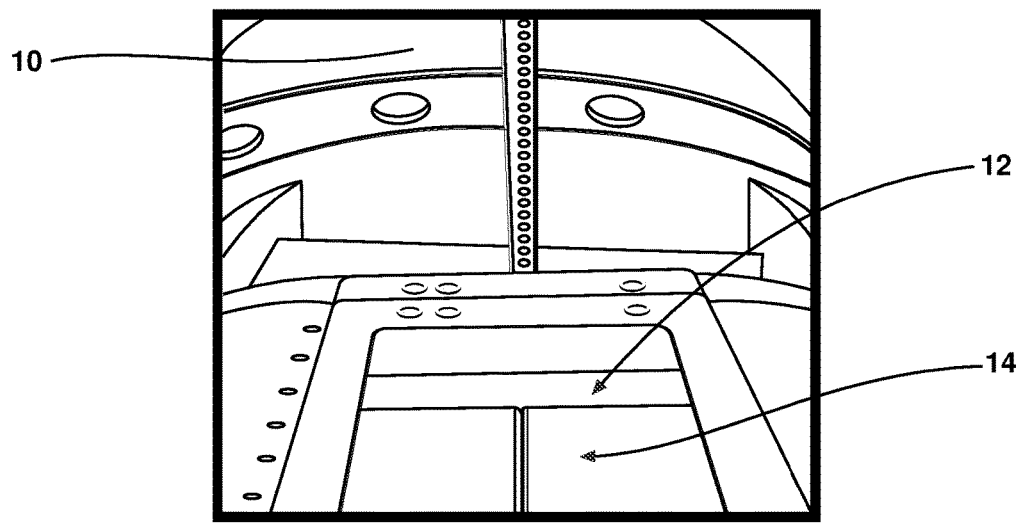
FIG. 2 is a top view showing the access opening of the fuel tank.
Figure 3:
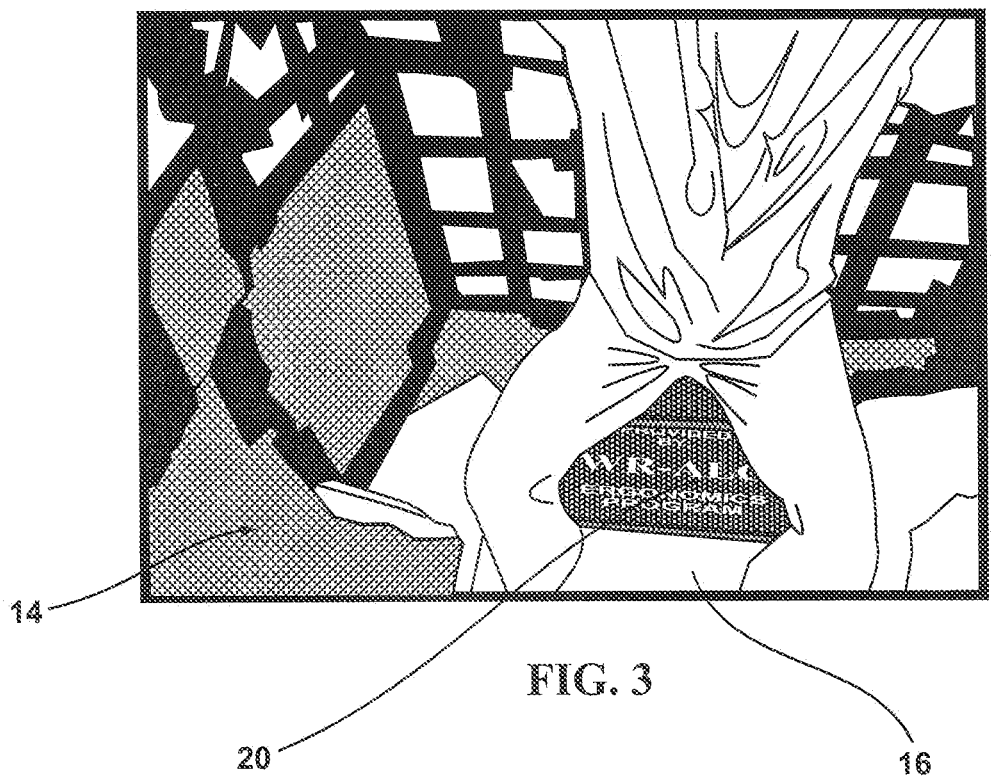
FIG. 3 is a perspective view showing a man inside the interior of the fuel tank.

FIGS. 1-3 show an example of a type of confined space that a worker may have to enter and perform maintenance therein. In these figures, the confined space is an F-15 aircraft fuel tank. It should be understood, however, that the present invention is not limited to use in servicing military aircraft, and can be used throughout the aerospace industry, or more broadly in any environment where work is being done in confined spaces. FIG. 1 shows a technician lowering himself into the aircraft fuel tank. FIG. 2 shows the access opening of the fuel tank. FIG. 3 shows a man inside the interior of the fuel tank.

Figure 4:
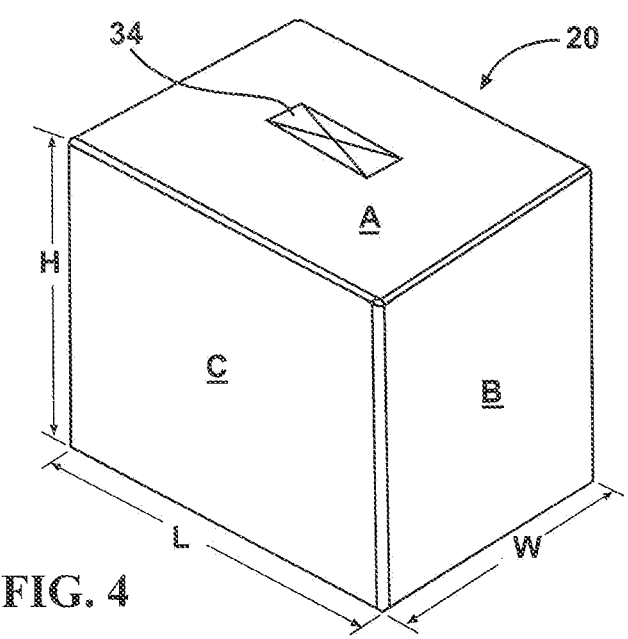
FIG. 4 is a perspective view of one embodiment of the support structure.
Figure 5:
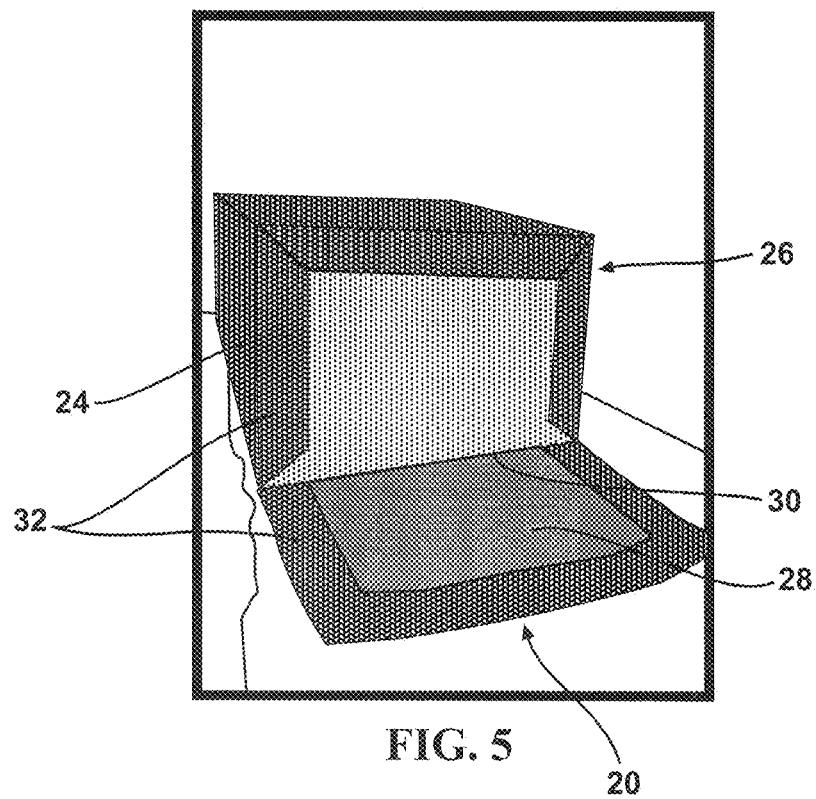
FIG. 5 is a perspective view of the top of the support structure showing the flap thereof in an open position.

FIGS. 4 and 5 show one non-limiting embodiment of a support structure for enabling workers to ergonomically perform tasks in confined spaces. As shown in these figures, the support structure comprises a compressible support structure 20 that is generally in the configuration of a rectangular prism or cuboid having six faces, a length L, width W, and a height H. There are three sets of opposing sides, which will be referred to as sides A, B, and C. The edges of the rectangular prism can be sharp or slightly rounded. The length, width, and height differ from one another so that the support structure 20 can be turned to provide three different height positions when the structure is placed on the floor of a work surface.

The top surface of the support structure 20 will be considered to be the surface that is facing upward when the support structure is placed on the floor of a work surface. The bottom surface of the support structure 20 will be considered to be the surface that is placed on the floor of a work surface. Since the support structure can be turned during use to place a different face of the same adjacent to the floor of the work surface, at a given time, the top and bottom surfaces of the support structure 20 may change in use.

Figure 8A:
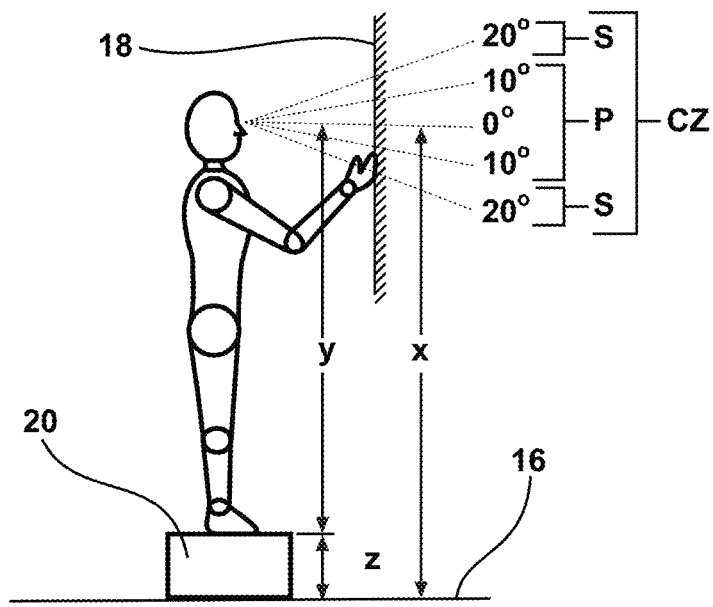
FIG. 8A is a schematic side view showing a person standing on the support structure in a working position inside a confined space.
Figure 8B:
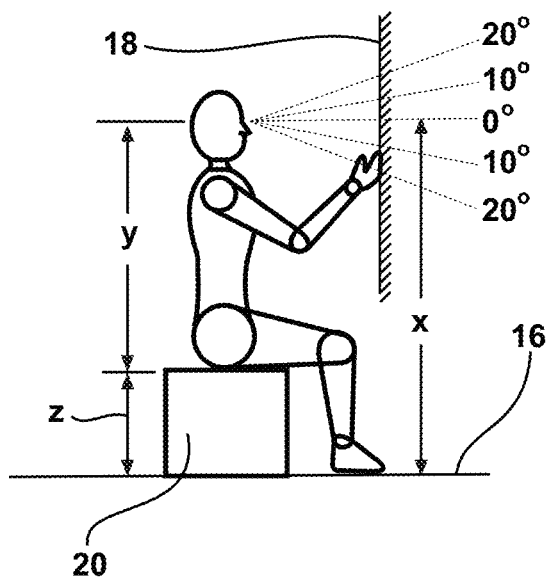
FIG. 8B is a schematic side view showing a person in a working position sitting on the support structure oriented at one height inside a confined space.
Figure 8C:
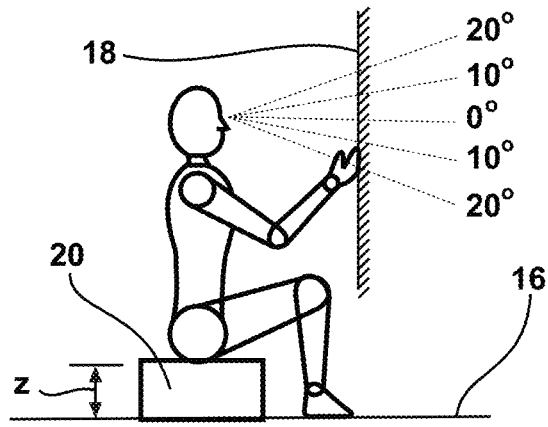
FIG. 8C is a schematic side view showing a person in a working position sitting on the support structure oriented at a different height inside a confined space.

The dimensions of the support structure 20 are determined when an ergonomics team identifies three work zones using a combination of ergonomics, anthropometrics, and kinesiology to determine the range of motion for different joints and what limb positions create the minimum and maximum amount of stress the worker's body. FIGS. 8A-8C show examples of the work area 18, which is the area on which work tasks are performed. As shown in FIGS. 9A-9D, the three work zones are primary P (or neutral), secondary S, and high risk R. The combination of the primary and secondary zones P and S is referred to as the technician's comfort zone CZ. The comfort zone CZ is the range of motion in which work tasks can be completed with limited stress/fatigue to the body. The comfort zone CZ is determined by several parameters.

The technicians' comfort zone CZ is directly influenced by their line of sight as shown in FIGS. 8A-8C and 9A, and this corresponds heavily with neck posture. According to ergonomic research, the least amount of stress occurs in the neck if the work area is directly in front of the worker and there is a vertical tilt variation no larger than 20 degrees from neutral neck position. In other words, the neck comfort zone for a technician will occur when the work area can be seen without bending the neck up or down more than 20 degrees.

Figure 9A:
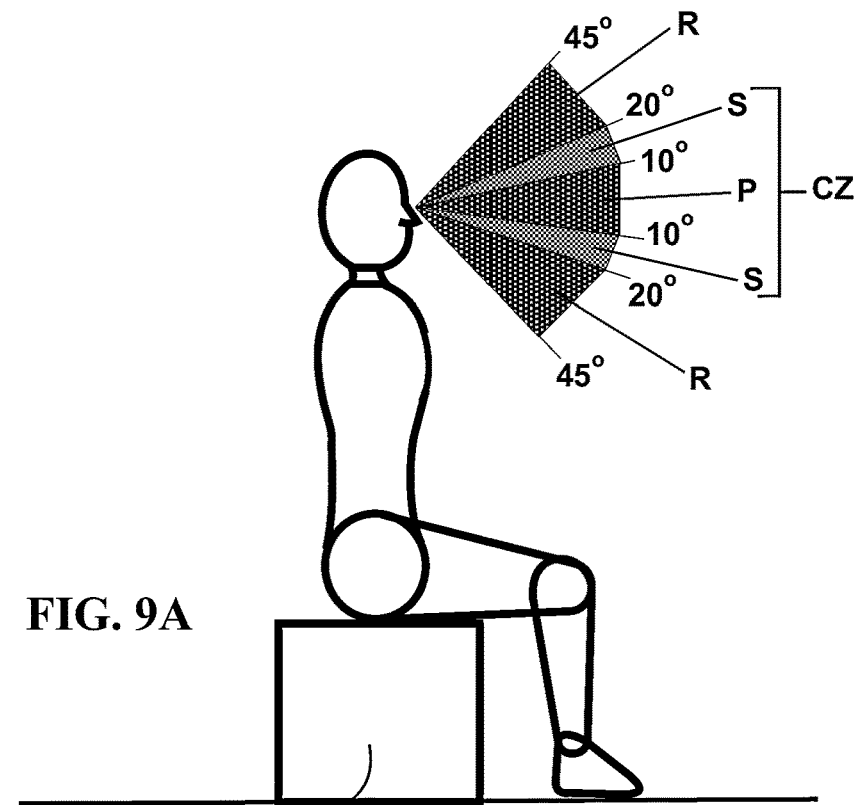
FIG. 9A is a diagram showing the primary, secondary, and high risk zones for head tilt.
Figure 9B:
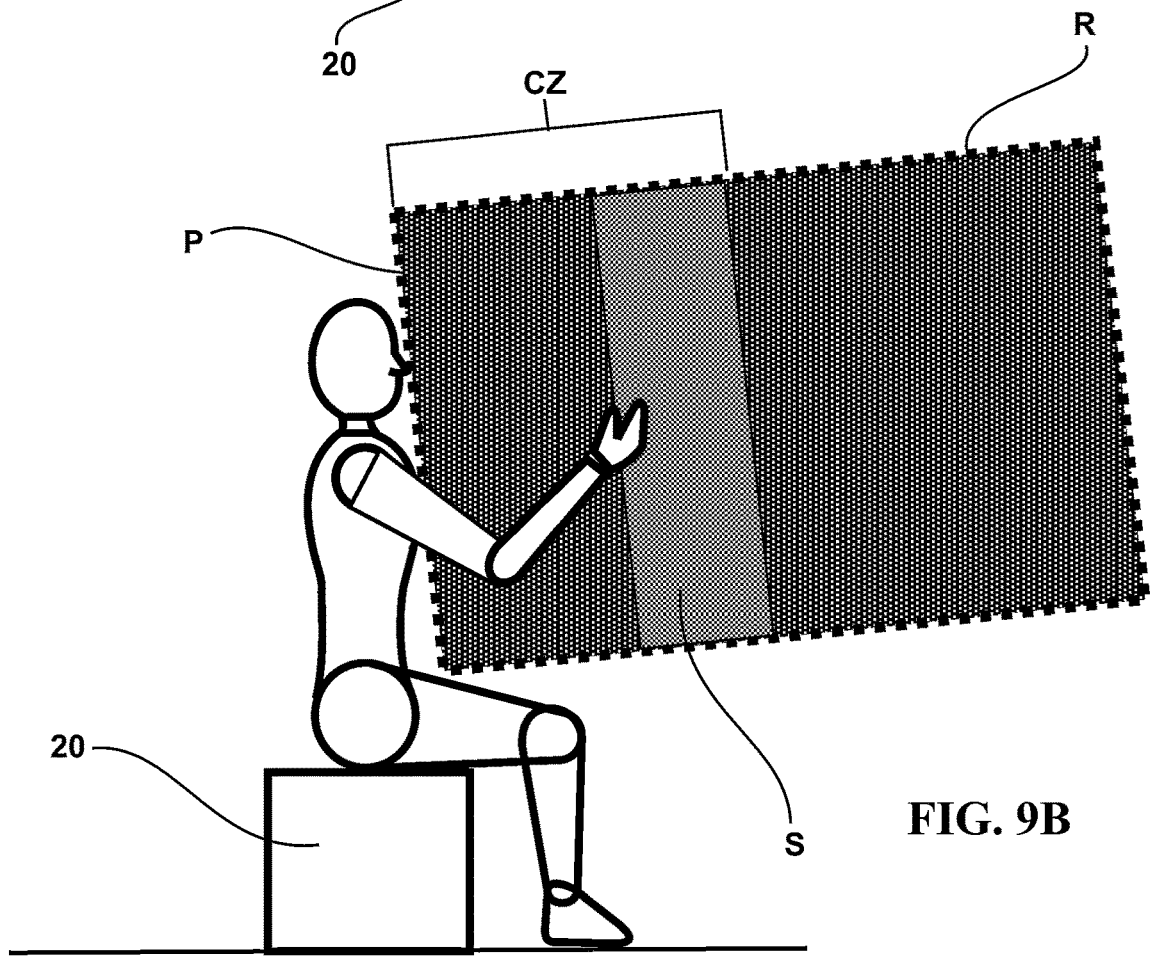
FIG. 9B is a diagram showing the different zones for reach.

The next comfort zone parameter is the position of the technician's back in relation to the work area. To remain in the comfort zone the technician should never bend forward more than 60 degrees and more than 25 degrees backward. FIG. 9B shows that with the use of the foam support structure 20 the technicians should be able to stay within the comfort zone parameters. The comfort zone for the arms is heavily related to the elbows distance from the hip. As the elbow moves away from the body the force exerted on the arm by gravity increases significantly. If the work task involves lifting, every 3 inches of distance essentially doubles the force exerted by the object.

Figure 9C:
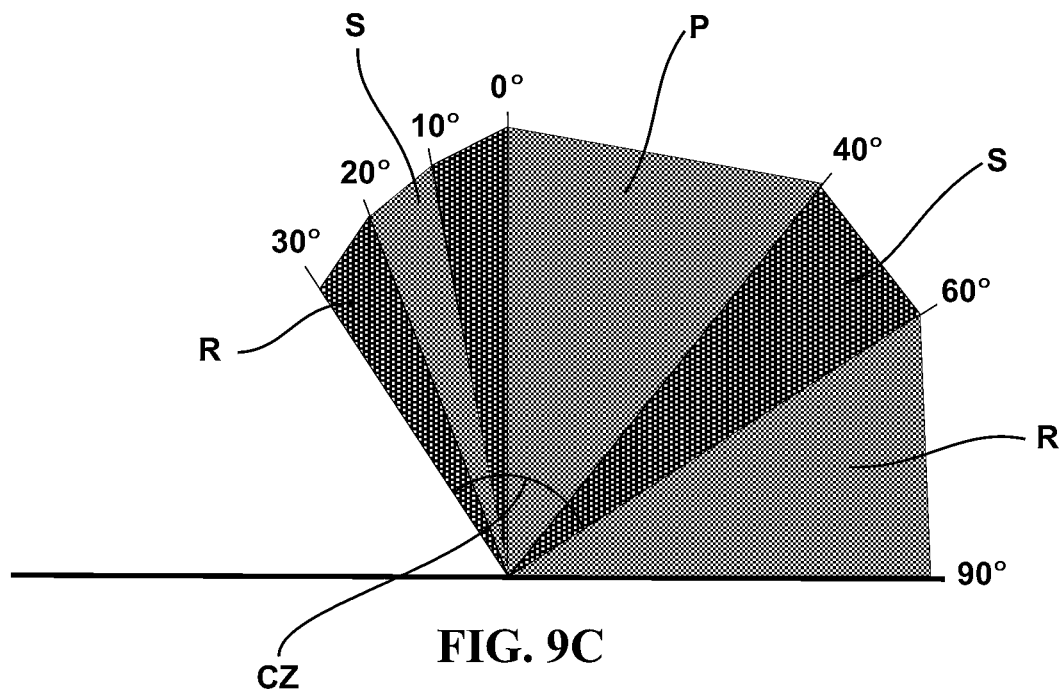
FIG. 9C is a diagram showing the different zones for elbow flexion/extension.

FIG. 9C shows ranges of motion for shoulder abduction and shoulder adduction. Shoulder abduction is the motion of the arm away from the middle of the body, raising your arm out from the sides of the body is an example of abduction. Normal lateral range is from the zero degree line to 90 degrees. Shoulder adduction is the motion of the arms toward the middle of the body, if you hug yourself, the shoulders are adducting. Normal range of movement is 30 degrees. This is highly dependent on flexibility and body composition as it is possible to reach 50 degrees of inward movement. This is important because these two movements work in conjunction to allow workers to work with tasks slightly outside the body frame in the vertical and horizontal directions without negatively affecting back and neck positioning.

Figure 9D:
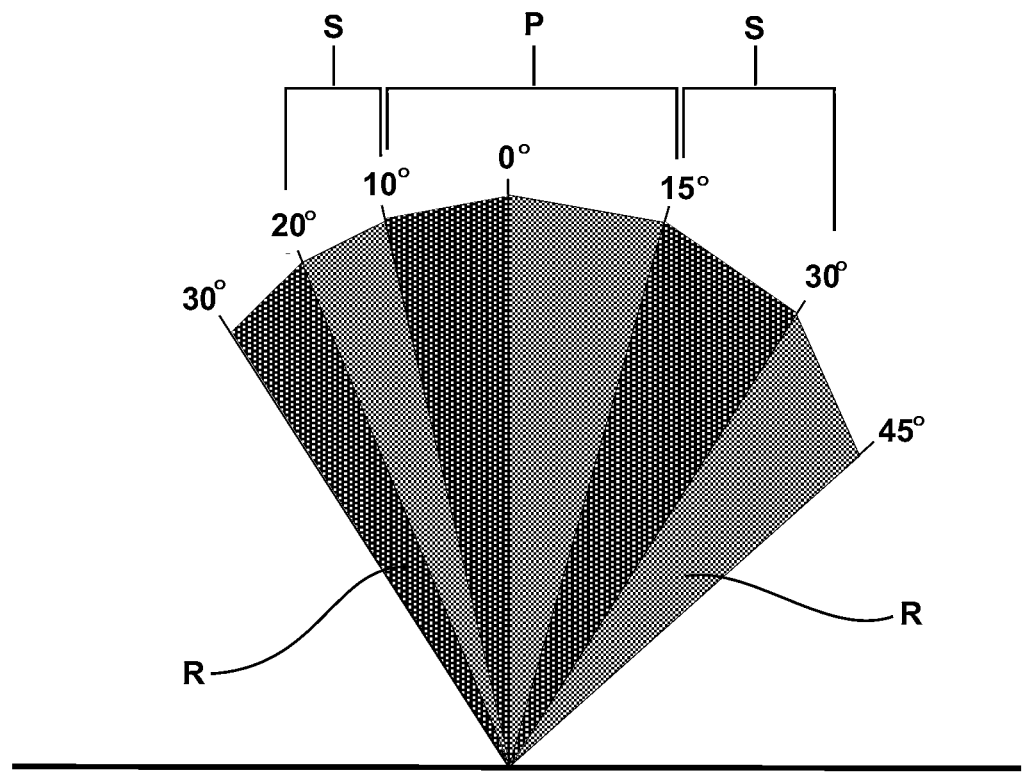
FIG. 9D is a diagram showing the different zones for shoulder abduction and adduction.

For the arm positioning comfort zones, there are additional factors such as the lateral range of motion of the elbow and shoulder joints. Elbow flexion/extension is the motion of a person's forearm towards or away from their body by bending at the elbow. FIG. 9D shows the zones associated with elbow flexing. This is important because it allows a person to complete tasks slightly outside their shoulder width without having to twist their body. In turn this helps keep proper back posture.

Since the worker's comfort zone is directly influenced by their line of sight, the ergonomics team calculates the support structure dimensions utilizing information such as the center point of the different work zones within the total work area and the average technician's body measurements to ensure that the technician is within their comfort zone ranges at each work zone. The dimensions are calculated by using the equation:

$$x-y=z$$

Where x is the distance from the floor to the center of the desired work zone, y is the worker's height measured from the floor to eye level, and z will give you the desired dimension for that side of the support structure 20.

For example referencing FIG. 8A, if the centerline of the work zone from the floor is 79 inches and the average worker standing eye level is 67 inches, then the desired dimension for that side of the support structure 20 would need to be 12 inches to place the worker's line of sight proportionate with the center of the work zone. For the next instance in FIG. 8B, if the work zone center is 48 inches, and the average sitting eye level is 31 inches, then the desired dimension would be 17 inches. Lastly, in FIG. 8C, if the work zone center is 44 inches, the desired dimension would be 13 inches.

The support structure 20 can have various suitable dimensions. The dimensions of the support structure 20 can be set so that the support structure provides three different height positions when the support structure 20 is placed on the floor of a work space. These may be referred to as a first, second, and third distance from the floor of the work space. The first, second, and third distances may differ from each other by any suitable amounts including, but not limited to by greater than or equal to: ½ inch, 1 inch, or any increments of ½ inch or 1 inch. In one embodiment, the support structure 20 has a length L of about 18 inches, width W of about 13 inches, and a height H of about 19 inches. In this embodiment, side A is defined as either side with 18 inch by 13 inch dimensions, side B is defined as either side with 19 inch by 13 inch dimensions, and side C is defined as either side with 18 inch by 19 inch dimensions. With the use of the support structure 20, the technicians have the ability to better position themselves within their comfort zones.

The support structure 20 can have any suitable amount of compressibility. The support structure 20 may be sufficiently compressible so that when it is placed on a surface that is contoured, or has protrusions thereon, the bottom of the support structure will conform to the configuration of the surface sufficiently so that the top of the support structure will provide a flat, level surface for the worker to sit or stand upon. The surface of the floor 14 of the confined space shown in the drawings, for example, has a concave configuration. The support structure 20 should also be sufficiently firm that the worker does not unduly sink into the top surface of the support structure 20 when sitting or standing on the same.

The support structure 20 can be made of any suitable materials. In some embodiments, as shown in FIG. 5, the support structure 20 is made of foam 22. Suitable types of foam include closed cell polyethylene foams having a nominal density of between about 8 lbs./ft$^3$ and about 10 lbs./ft$^3$. One suitable foam is a closed cell cross-linked polyethylene foam known as XP-80R available from Worldwide Foam of Elkhart, Ind., U.S.A. This particular foam has a nominal density of about 9 lbs./ft$^3$ measured according to ASTM D3575. This foam has a firmness of about 65 Asker C measured according to ASTM D2240. This foam has a 50% 24 hour compression set of less than about 12% measured according to ASTM D3575 Suffix B. The foam may have a 25% compression strength of between about 40 lb./in$^2$ (psi.) and about 60 psi., and a 50% compression strength of between about 65 psi. and about 85 psi. measured according to ASTM D3575 Suffix D. This particular foam has a 25% compression strength of about 50 psi., and a 50% compression strength of about 75 psi. measured according to ASTM D3575 Suffix D.

FIG. 5 shows that the foam may have a cover 24 thereon. The cover 24 can be provided in the form of a soft sided box configuration 26 having a lid 28 provided by a living hinge 30 made of the cover material. Such a cover 24 may help secure the foam material in place while also providing an extra layer of protection against any potential damage to the contact surface and added comfort to the user. The cover 24 can be made of any suitable material that provides one or more of these properties. In some cases, the cover 24 can comprise a PVC coated polyester fire retardant grade reinforced vinyl material. In one embodiment, the vinyl material is an 18 oz. vinyl coated polyester material #100820 from Top Value Fabrics of Carmel, Ind. U.S.A.

In this embodiment, the cover 24 may be double stitched on all sides except the one forming the lid 28 to allow the foam to be removed in the event it needs to be replaced, or the cover needs to be cleaned. The lid 28 can be provided on any side or face of the box 26. The lid 28 of the box can be fastened to the body of the box in any suitable manner by any suitable fastener. In the embodiment shown, the lid 28 is releasably fastenable to the body of the box 26 by mechanical fasteners 32, such as strips of VELCRO® hook and loop fastening material.

Figure 6:
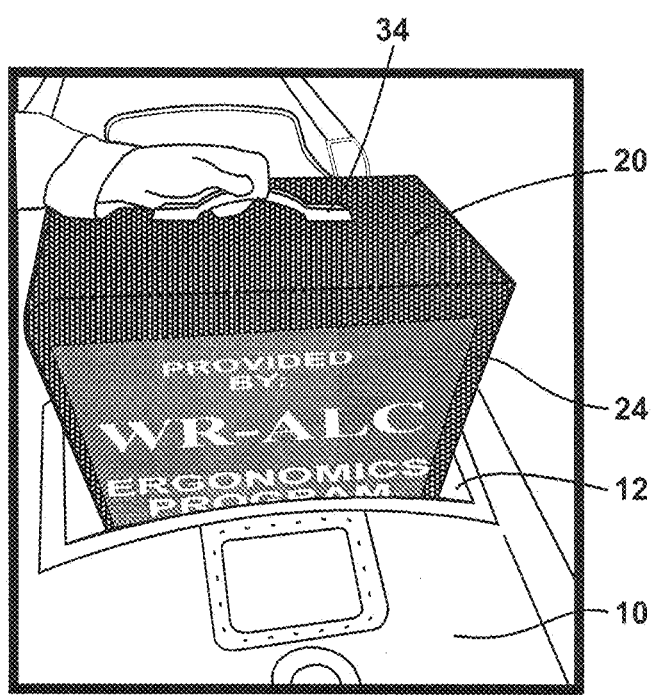
FIG. 6 is a perspective view showing the support structure being inserted into the access opening of the fuel tank.
Figure 7A:
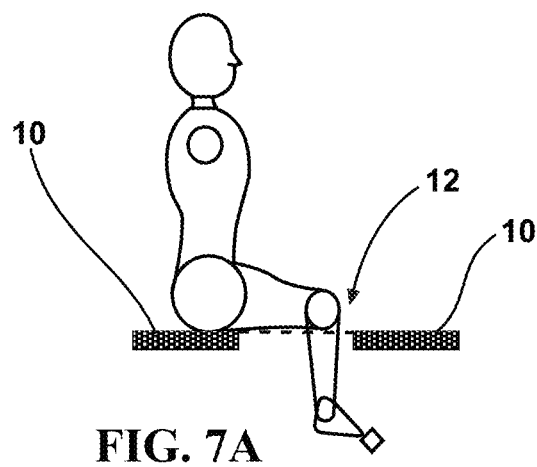
FIG. 7A is a schematic side view showing a first step in the process of a person lowering themselves into a confined space through an access opening.
Figure 7B:
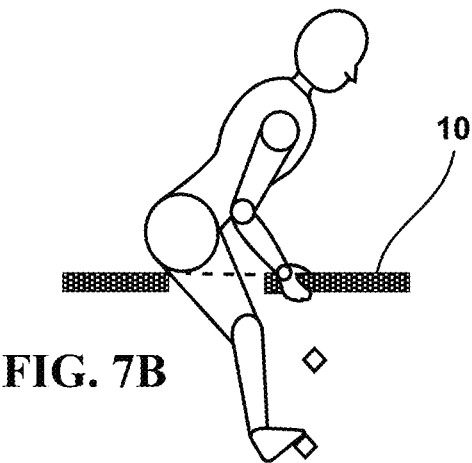
FIG. 7B is a schematic side view showing a second step in the process of a person lowering themselves into a confined space through an access opening.
Figure 7C:
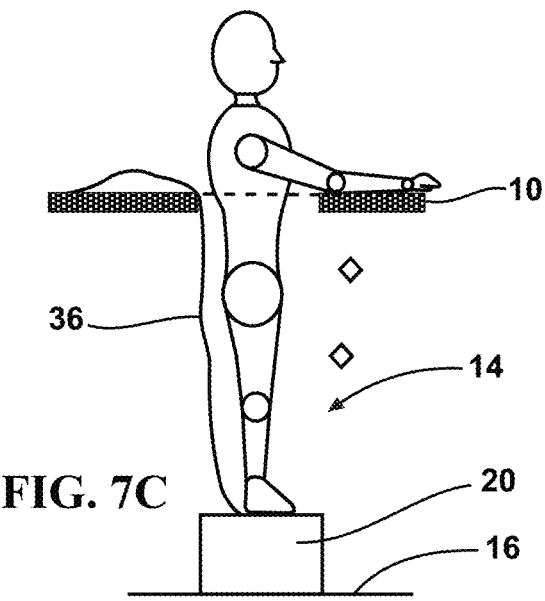
FIG. 7C is a schematic side view showing a third step in the process of a person lowering themselves into a confined space through an access opening.

The support structure 20 can have additional features. In some embodiments, as shown in FIG. 6, the support structure 20 may have a handle 34 on one of its faces. The handle 34 can be used for carrying the support structure 20. The handle 34 can be used for joining a rope or lanyard 36 thereto, as shown in FIG. 7C, for lowering and raising the support structure 20 into a work area in a confined space for ingress and egress, respectively.

An ergonomic method for working in a confined work space is also provided. In some cases, the confined work space may have an entry opening 12, and the interior 14 of the confined space may be lower than the entry opening. The confined space will typically have a surface or floor 16 to support a person therein. The surface 16 may or may not be flat. In some cases, the surface may be concave. In some cases, the surface may have sharp edges, protrusions, or the like thereon.

The method may comprise the steps of:

a) providing a support structure that is generally in the configuration of a rectangular prism having six faces, a length, width, and a height, wherein the length, width, and height differ from one another so that the structure provides three different height positions when the structure is placed on a surface;

b) lowering the support structure onto the surface of the confined space so that one of its faces is in contact with the surface of the confined space;

c) a worker entering the entry opening of the confined space and standing on the support structure;

d) changing from a standing position to sitting on the support structure to perform work within the confined space;

e) changing from a sitting position to standing on the support structure to exit the confined space, and exiting the confined space; and f) removing the support structure from the confined space.

The method may comprise a step of performing work, such as maintenance work, while in the confined space. In the case of an F-15 fuel tank, the work may occur after the internal plumbing, fuel bladder, and fuel contents are removed from the tank. As shown in FIGS. 7A-7C, the technicians must enter the top of the tank feet first and then use their upper body to slowly lower their body into the interior 14. The work may involve the technicians entering the tank to manually tape all brackets, rivets, and other sharp edges inside the fuel tank that could puncture the bladder when it is replaced.

The method may further comprise one or more steps of the person raising from a sitting position on the support structure 20, and turning the support structure so that a different face of the support structure 20 is placed against the floor 16 of the work surface to provide a top surface of the support structure with a different distance from the floor, and sitting or standing on the support structure. The support structure 20 is ideally oriented so that the height of the support structure ensures that the work tasks are performed in the comfort zone in relation to the neck position and line of sight. As shown in FIGS. 8A-8C, the work can be performed by a worker when either sitting or standing on the support structure 20.

There are numerous, non-limiting embodiments of the methods of the invention. The steps of the methods described herein may be performed in any suitable order.

The support structure 20 and methods described herein can provide a number of advantages. It should be understood, however, that these advantages need not be required unless they are set forth in the appended claims. The support structure 20 is a portable article that provides variable height seating for technicians to help them access different work locations and heights while maintaining good ergonomic practices. The support structure 20 and methods described herein provide a safe way to enter a confined space and a safe surface upon which to step when the interior of the confined space is lower than the entry opening, that is not subject to tipping as is the 5-gallon bucket previously used for this purpose.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An ergonomic method for working in confined work spaces, said method comprising the steps of:
    a) providing a support structure that is generally in the configuration of a rectangular prism having six faces, a length, width, and a height, wherein the length, width, and height differ from one another so that said support structure provides three different height positions when said support structure is placed on the floor of a work space;
    b) placing the support structure with one of its faces in contact with a contoured floor surface in a confined work space, wherein the support structure has a top surface that faces upward when the support structure is placed on a surface and a bottom surface that is placed upon the floor of the work space so that the top surface of the support structure is spaced a first distance from the floor of the work space, wherein the support structure is compressible so that the bottom surface will conform to the configuration of the floor of the work space sufficiently so that the support structure will provide a flat, level top surface for the worker to sit or stand upon when any of the faces is placed in contact with the floor of the work space; and
    c) sitting or standing on said support structure.

2. The method of claim 1 wherein said contoured floor surface is curved.

3. The method of claim 2 wherein said contoured floor surface is concave.

4. The method of claim 1 wherein said contoured floor surface has protrusions thereon.

5. The method of claim 3 wherein said contoured floor surface has protrusions thereon.

6. The method of claim 1 further comprising:
    d) changing position from a sitting or standing position on top of the support structure so that no weight is placed on the support structure, and the support structure can be turned;
    e) turning the support structure onto a different face to form a new top surface wherein the new top surface of the support structure is spaced a second distance from the floor of the work space, and the second distance differs from the first distance; and
    f) sitting or standing on the new top surface of the support structure that provides a different height above the floor of the work surface.

7. An ergonomic method for working in a confined work space having an entry opening wherein the interior of the confined space is lower than the entry opening, and the confined space has a floor surface to support a person therein, wherein the floor surface is contoured, said method comprising the steps of:
    a) providing a support structure that is generally in the configuration of a rectangular prism having six faces, a length, width, and a height, wherein the length, width, and height differ from one another so that said structure provides three different height positions when said structure is placed on a floor surface, wherein the support structure is compressible so that the bottom surface will conform to the configuration of the contoured floor surface sufficiently so that the support structure will provide a flat, level top surface for the worker to sit or stand upon when any of the faces is placed in contact with the floor surface;
    b) lowering the support structure onto the floor surface of the confined space so that one of its faces is in contact with the surface of the confined space;
    c) entering the entry opening of the confined space and standing on the support structure;
    d) changing from a standing position to sitting on said support structure to perform work within the confined space;
    e) changing from a sitting position to standing on the support structure to exit the confined space, and exiting the confined space; and
    f) removing the support structure from the confined space.

8. The method of claim 7 wherein the floor surface is curved.

9. The method of claim 8 wherein the floor surface is concave.

10. The method of claim 7 wherein the floor surface has protrusions thereon.

11. The method of claim 9 wherein the floor surface has protrusions thereon.

12. The method of claim 7 wherein the confined work space is the inside of an aircraft fuel tank.

\* \* \* \* \*